UNITED STATES PATENT OFFICE.

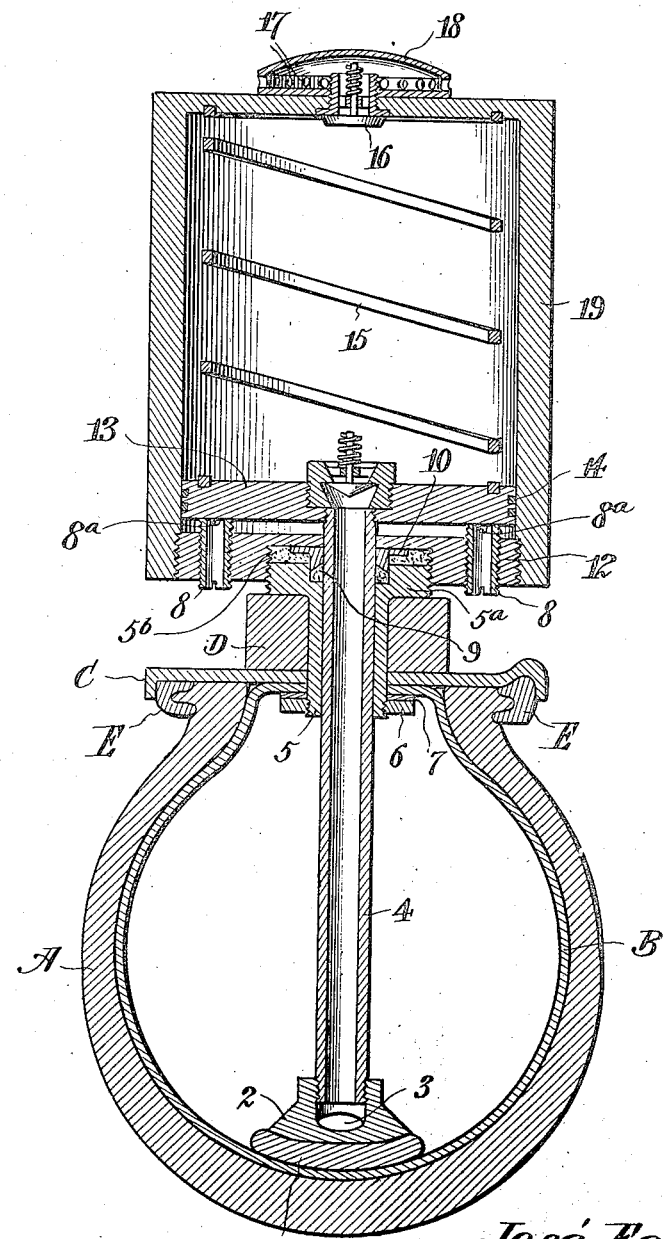

JOSÉ FERNANDEZ, OF HOUSTON, TEXAS.

SELF-INFLATING TIRE.

1,125,678.  Specification of Letters Patent.  Patented Jan. 19, 1915.

Application filed March 17, 1914. Serial No. 825,312.

*To all whom it may concern:*

Be it known that I, José Fernandez, a citizen of the United States, residing at Houston, in the county of Harris and State of Texas, have invented new and useful Improvements in Self-Inflating Tires, of which the following is a specification.

The present invention has relation to pneumatic tires for vehicle wheels and more particularly to the means whereby such tires are inflated, such means being of the automatic type and operable by the weight sustained by the tire.

The invention relates to the type of tire inflaters which is automatic in operation and embodies a cylinder, a spring actuated piston arranged to operate within the cylinder, connecting means between such cylinder and rim of the vehicle wheel and a hollow stem extending from the piston and arranged to operate within the tire, the opening or passage through such stem being controlled by means of a valve which opens to admit compressed air to pass from the cylinder into the tire and which closes to prevent any escape of pressure from the tire.

The invention consists of the novel features, details of construction and combination of parts, which hereinafter will be more particularly set forth, illustrated and claimed, and as shown in the accompanying drawing which is a transverse section of a pneumatic tire and compressor embodying the invention.

The invention is adapted to be applied to pneumatic tires of any type.

The drawing illustrates a tire embodying a casing A and inner tube B, rim C, felly D and securing rings E.

Within the tire is arranged a cap 1, head 2 having an outlet 3 and hollow stem 4, the latter being adapted to operate in a hollow connection 5 to the inner end of which is fitted a nut 6 and washer 7. The hollow connection 5 is formed at its outer end with an exteriorly threaded head 5ª, which is adapted to screw into an opening 5ᵇ formed in a disk 12 in which is fitted nipples or short tubes 8. A gland 10 is placed within the opening 5ᵇ and acts in conjunction with the head 5ª of the hollow connection 5 to confine a packing 9 by means of which a tight joint is maintained between the stem 4 and parts 12 and 5. A piston 13 arranged to operate within a cylinder 19 is provided with packing rings 14 and has the hollow stem 4 attached thereto and is provided with a valve 11 which opens inward and closes by an outward movement, thereby admitting of air compressed within the cylinder 19 passing through the stem 4 into the tire, while at the same time loss of pressure from such tire is prevented. An expansible helical spring 15 is arranged within the cylinder 19 and normally exerts a pressure upon the piston 13 to hold the same at the limit of its movement in one direction. An inwardly opening valve 16 is located at the outer end of the cylinder 19 to admit air into such cylinder upon the relatively outstroke of the piston. The instroke of the piston is that movement whereby the piston travels from the part 12 toward the end of the cylinder having the valve 16 and the outstroke is that movement whereby the piston travels from the end of the cylinder having the valve 16 toward the end closed by means of the disk or part 12. A cover 18 is fitted to the end of the cylinder having the valve 16 and protects such valve and is formed in its edge with small openings 17 for the admission of air upon the outstroke of the piston.

The nipples or short tubes 8 act as breathers for the ingress of air upon the instroke of the piston and for the egress of air upon the outstroke of such piston. The nipples or short tubes 8 further provide means for oiling the interior of the cylinder and also serve as means for adjusting the stroke of the piston. The nipples of short tubes 8 are threaded to openings formed in the disk 12 and may be turned so as to project beyond the inner face of the part 12 to a greater or less distance according to the length of stroke of the piston required.

The inner ends of the nipples or tubes 8 are formed with notches 8ª to prevent closing of such nipples by the piston when the latter is in engagement with the inner ends of such nipples.

When the parts are properly assembled the piston 13 is held at the limit of its outward movement by means of the nipples or short tubes 8 and by means of the spring 15 which normally exerts a pressure thereon. When that part of the tire opposite the cap end of the stem 4 reaches the ground or surface and is depressed, the stem 4 has a longitudinal movement imparted thereto and such movement is transmitted to the piston 13 which is caused to move within the cylinder 19 and compress the air therein, such air passing through the hollow stem 4 into the tire. When the stem is relieved from the load pressure it, the stem, and the piston 13 are moved outward by the spring 15, such movement of the piston drawing a free charge of air into the cylinder through the valve controlled inlet 16. When the stem 4 is again moved by the load pressure the operation is repeated, thereby automatically charging the tire and keeping the same inflated. By making the tubes 8 of sufficient length and by proper adjustment thereof in the manner stated movement of the stem 4 and piston 13 may be regulated and as a result the degree of inflation of the tire controlled.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely ilustrative, and that such changes may be made when desired as are within, the scope of the invention as claimed.

Having thus described the invention, what is claimed as new is:—

In means for automatically inflating pneumatic tires, the same comprising a cylinder, a spring actuated piston arranged to operate within the cylinder and a hollow stem connected with such piston and extending into the tire to be inflated, said cylinder and stem having valve controlled openings, and nipples or short tubes threaded into an end of the cylinder and adapted to engage the piston to limit the movement thereof.

In testimony whereof I affix my signature in presence of two witnesses.

JOSÉ FERNANDEZ.

Witnesses:
 ISAAC GARZA,
 ALBERTO SADA.